(No Model.)
W. H. SEIDERS & G. H. HOOD.
ROPE CLASP.
No. 430,043. Patented June 10, 1890.
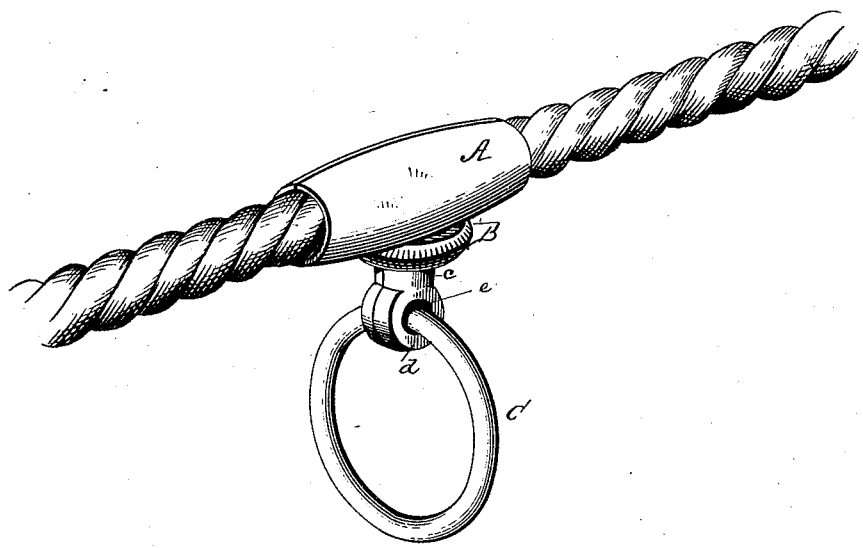
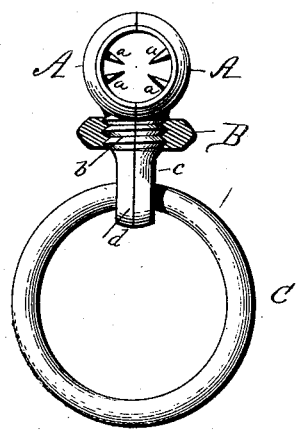
Witnesses
Inventors
William H. Seiders
George H. Hood
By their Attorneys
Gillson & Benjamin

UNITED STATES PATENT OFFICE.

WILLIAM HANBY SEIDERS AND GEORGE HENRY HOOD, OF SPRING GREEN, WISCONSIN.

ROPE-CLASP.

SPECIFICATION forming part of Letters Patent No. 430,043, dated June 10, 1890.

Application filed February 10, 1890. Serial No. 339,843. (No model.)

*To all whom it may concern:*

Be it known that we, WILLIAM HANBY SEIDERS and GEORGE HENRY HOOD, citizens of the United States, residing at Spring Green, in the county of Sauk and State of Wisconsin, have invented a certain new and useful Rope-Clasp; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in clasps especially adapted to be used with ropes.

It has for its objects to secure a clasp that is cheap and simple in construction, positive and reliable in its gripping qualities, and quickly and easily detachable.

In the accompanying drawings, Figure 1 is a perspective view of our improved clasp gripping a piece of rope. Fig. 2 is an end view of the clasp, partly in section.

The clasp proper is in two parts, exact duplicates of each other, each of which consists of the half-cylindrical and semi-elliptical jaw A, having upon its inner face points or teeth $a$, and being provided at right angles to the jaw with a neck semi-spherical in cross-section, the upper portion $b$ of which is threaded and of greater diameter than the middle portion $c$, which is plain, and terminating in the flattened extension $d$, which is provided with a slot $e$, through which loosely passes the ring C.

Upon the threaded portion $b$ of the neck of the clasp is the nut B, which is provided with internal threads of the same pitch and size as the external threads on the portion $b$ of the neck.

The application of our improved clasp to the purposes for which it is designed is as simple as is its construction. To enable the clasp to grip a rope, the nut B is unscrewed until it is free from the threaded portion of the neck, when it will drop to the part of the neck that is of smaller diameter than the nut. This will permit of the opening of the jaws of the cylinder, so that they may be placed around the rope. Then by screwing up the nut until it abuts against the cylinder formed by the closed jaws the latter are firmly and securely closed, and the teeth penetrate the meshes of the rope and prevent it from slipping. Should the strain on the rope cause the teeth to spread the strands of the rope, the latter would bear against the ends of the cylinder, which being of less diameter than the central part of the cylinder would serve to prevent the slipping of the rope.

As will be apparent, our clasp may be used in connection with rope halters, cattle-ties, fire-escapes, hammocks, &c., the ring C permitting its attachment to many forms of devices.

Having thus described our invention, what we claim as new, and desire to cover by Letters Patent, is—

1. A clasp consisting of two independent jaws each provided with teeth or projections extending inwardly, and with a slotted and threaded neck at an angle with and formed as a part of said jaws, and a threaded nut adapted to screw upon the threaded portion of the jaws and bind them together, substantially as and for the purposes described.

2. A clasp consisting of the jaws A, provided with the teeth $a$, the neck consisting of the parts $b$, $c$, and $d$, the nut B, and the ring C, as described, and for the purposes set forth.

In testimony whereof we affix our signatures in presence of two witnesses.

WILLIAM HANBY SEIDERS.
GEORGE HENRY HOOD.

Witnesses:
DANIEL D. DAVIES,
THOMAS D. DAVIES.